(12) United States Patent
Fortunato et al.

(10) Patent No.: US 9,950,911 B2
(45) Date of Patent: Apr. 24, 2018

(54) ADJUSTABLE WEAR PAD ASSEMBLY FOR A TELESCOPIC BOOM

(71) Applicant: CNH Industrial America LLC, New Holland, PA (US)

(72) Inventors: Adolfo Fortunato, Veglie (IT); Emanuele Simonetti, Monteroni di Lecce (IT)

(73) Assignee: CNH Industrial America LLC, New Holland, PA (US)

(*) Notice: Subject to any disclaimer, the term of this patent is extended or adjusted under 35 U.S.C. 154(b) by 0 days.

(21) Appl. No.: 14/894,603

(22) PCT Filed: May 30, 2014

(86) PCT No.: PCT/EP2014/061282
§ 371 (c)(1),
(2) Date: Nov. 30, 2015

(87) PCT Pub. No.: WO2014/191561
PCT Pub. Date: Dec. 4, 2014

(65) Prior Publication Data
US 2016/0130119 A1    May 12, 2016

(30) Foreign Application Priority Data

May 31, 2013  (IT) .............................. MO2013A0158

(51) Int. Cl.
*B66C 23/70*    (2006.01)
*F16C 29/02*    (2006.01)

(52) U.S. Cl.
CPC ............ *B66C 23/707* (2013.01); *F16C 29/02* (2013.01); *F16C 2326/00* (2013.01)

(58) Field of Classification Search
CPC ........ F16C 29/001; F16C 29/02; F16C 33/08; B66C 23/702; B66C 23/707; B66C 23/708
(Continued)

(56) References Cited

U.S. PATENT DOCUMENTS 3,537,762 A * 11/1970 Lodige .................... F16C 29/02
384/42
3,719,403 A    3/1973 Sung
(Continued)

FOREIGN PATENT DOCUMENTS

CN    202272660 U    6/2012
CN    202297059 U    7/2012
(Continued)

*Primary Examiner* — James Pilkington
(74) *Attorney, Agent, or Firm* — Patrick M. Sheldrake

(57) ABSTRACT

A wear pad assembly for a telescopic boom includes a wear pad having a first side for contacting an outer wall of an inner section of the boom, and a second side facing an inner wall of an outer section of the boom. At least one rigid plate is secured to the second side of the wear pad, and a stud in screw-threaded engagement with the outer section of the boom or a plate secured to the outer section of the boom is associated with each rigid plate, the end of stud and the associated rigid plate having mating formations to enable the stud to urge the first surface of the wear pad against the outer wall of the inner section while preventing the wear pad from being displaced in a plane normal to the axis of rotation of the stud.

9 Claims, 2 Drawing Sheets

(58) Field of Classification Search
USPC ............................................. 384/39, 40, 42
See application file for complete search history.

(56) References Cited

U.S. PATENT DOCUMENTS

| | | |
|---|---|---|
| 3,952,466 A | 4/1976 | Spain |
| 4,045,936 A | 9/1977 | Sterner |
| 6,499,612 B1 | 12/2002 | Harrgington et al. |
| 8,152,086 B2 | 4/2012 | Moller et al. |
| 8,801,354 B2 | 8/2014 | Lettau |
| 2002/0145278 A1 | 10/2002 | Hulse et al. |

FOREIGN PATENT DOCUMENTS

| | | | |
|---|---|---|---|
| EP | 0747532 | * | 12/1996 |
| EP | 1555237 A2 | | 7/2005 |
| EP | 1982948 A2 | | 10/2008 |
| JP | S58165050 U | | 11/1983 |
| JP | H10101293 A | | 4/1998 |
| JP | H11130378 A | | 5/1999 |
| WO | 2008130403 A1 | | 10/2008 |

* cited by examiner

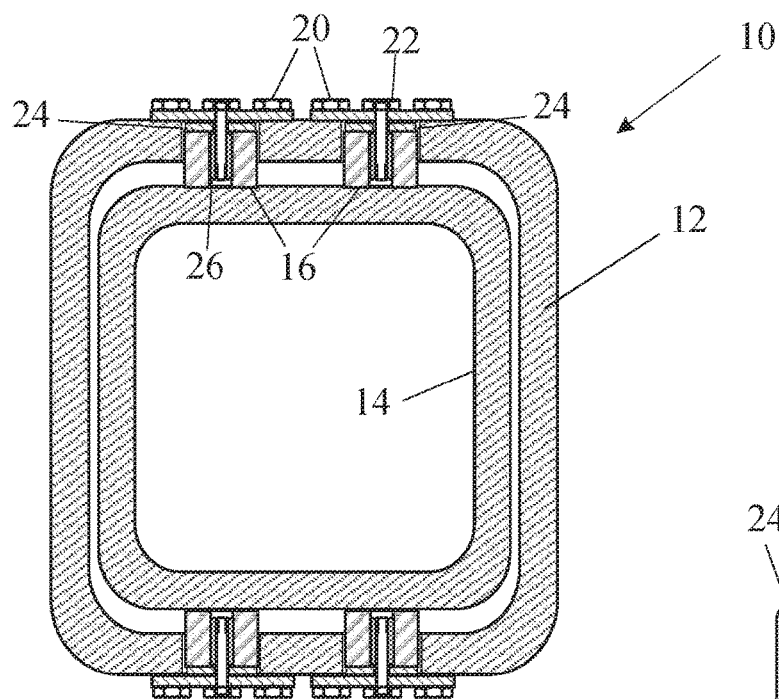
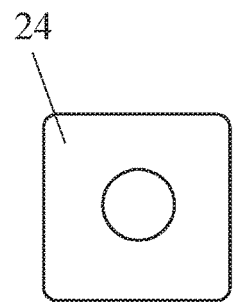
Fig. 3
Prior Art
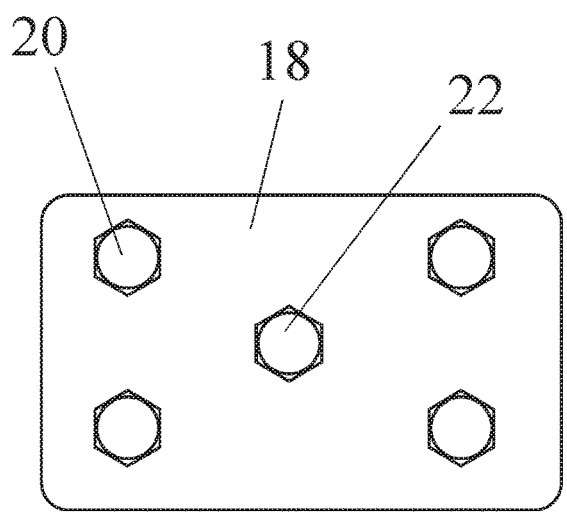
Fig. 2
Prior Art
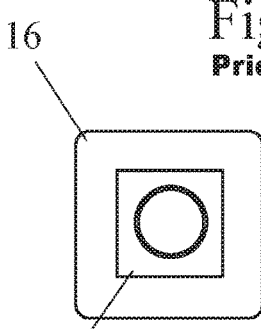
Fig. 4
Prior Art

ADJUSTABLE WEAR PAD ASSEMBLY FOR A TELESCOPIC BOOM

This application is the US National Stage filing of International Application Serial No. PCT/EP2014/061282 filed on May 30, 2014 which claims priority to Italian Application MO2013A000158 filed May 31, 2013, each of which is incorporated herein by reference in its entirety.

FIELD OF THE INVENTION

The present invention relates to an adjustable wear pad assembly for a telescopic boom.

BACKGROUND OF THE INVENTION

The sections of a telescopic boom are required to slide axially relative to one another smoothly while at the same time not moving relative to one in a transverse direction. To reduce friction and to take up unavoidable gaps between the sections, wear pads made of a suitable material such as nylon, are placed between the sections at the front and rear axial end of each section.

A known design of wear pad assembly is shown in FIGS. 1 to 4 of the accompanying drawings. FIG. 1 is a section through two overlapping sections 12 and 14 of a telescopic boom 10, the inner section 14 being supported by means of four conventional wear pads assemblies. FIG. 2 shows a plan view of a mounting plate 18 of one of the wear pad assemblies in FIG. 1. Each mounting plate 18, shown in plan in FIG. 2, is itself bolted to the outer section 12 of the boom 10 by means of four bolts 20 and a fifth longer bolt 22 passes through the mounting plate 18 and a shim or spacer 24, which is shown in plan in FIG. 3, to engage within a threaded insert 26 in a wear pad 16, the latter being shown in plan in FIG. 4. The wear pad 16 is in this way clamped to mounting plate 18 and the thickness of the spacer or shim 24 is selected to ensure that the inner surface of the wear pad 16 contacts the outer surface of the inner section 14 to take up the clearance between the two sections 12 and 14 while allowing them to slide smoothly relative to one another.

Because of the accumulation of tolerances, one cannot dimension a wear pad to fit precisely in all locations and instead shims of different thickness are required at the different locations. This creates a requirement for many different parts and complicates assembly. Furthermore, as the pads 16 wear down, the clearance cannot be adjusted without dismantling the wear pad assemblies and replacing the shims 24. A still further disadvantage stems from the fact that only the surface area of the wear pad surrounding the insert 26 can be used to engage the outer surface of the inner section 14 of the boom 10, necessitating the use of larger wear pads 16.

SUMMARY OF THE INVENTION

With a view to mitigating at least some of the foregoing disadvantages, there is provided in accordance with the present invention a wear pad assembly for mounting between an inner and an outer section of a telescopic boom, comprising a wear pad having a first side for contacting an outer wall of the inner section of the boom, and a second side facing an inner wall of the outer section of the boom, wherein at least one rigid plate is secured to the second side of the wear pad so as not to be movable relative to the wear pad, and a stud in screw-threaded engagement with the outer section of the boom or a plate secured to the outer section of the boom is associated with each rigid plate, the end of stud and the associated rigid plate having mating formations to enable the stud to urge the first surface of the wear pad against the outer wall of the inner section of the boom while preventing the wear pad from being displaced in a plane normal to the axis of rotation of the stud.

Each rigid plate serves to apply a compressive force evenly over the surface of the wear pad in contact with the inner section of the boom as well as to withstand the shear forces on the wear pad as the sections of the boom slide relative to one another.

Each rigid plate may be bonded in any suitable manner to the second side of the wear pad but to simplify manufacture it may conveniently be an interference fit in a recess formed in the second side of the wear pad.

In some embodiments of the invention, the mating formations comprise a circular hole in the rigid plate and a cylindrical spigot, or dog, on the end of the stud.

Advantageously, the area of the first side of the wear pad capable of contacting the outer surface of the inner section of the boom is substantially equal to the area bounded by the lateral edges of the wear pad. Thus, unlike the annular contact surface of the wear pad shown in FIG. 4, the contact surface of the wear pad of a preferred embodiment of the invention is continuous, thereby allowing a greater load bearing surface area for a given circumference.

In accordance with a second aspect of the invention, there is provided a wear pad for use in an assembly, comprising a body of plastics material having oppositely facing sides, wherein one side is continuous and at least one rigid plate is secured to the oppositely facing side of the body, the rigid plate being formed with a formation capable of interacting with a screw threaded stud to prevent the wear pad from moving in a plane normal to the axis of the stud.

Preferably, two rigid plates are secured to the oppositely facing side of the body and each is secured to the body by being an interference fit in a respective recess formed in the oppositely facing side of the body.

BRIEF DESCRIPTION OF THE DRAWINGS

The invention will now be described further, by way of example, with reference to the accompanying drawings, in which:

FIG. 1 is, as earlier described, a section through a boom fitted with four known wear pad assemblies, FIGS. 2, 3 and 4 are, as previously described, plan views of a mounting plate, a shim and a wear pad, respectively, of one of the wear pad assemblies shown in FIG. 1.

DETAILED DESCRIPTION OF THE DRAWINGS

Figure 5:
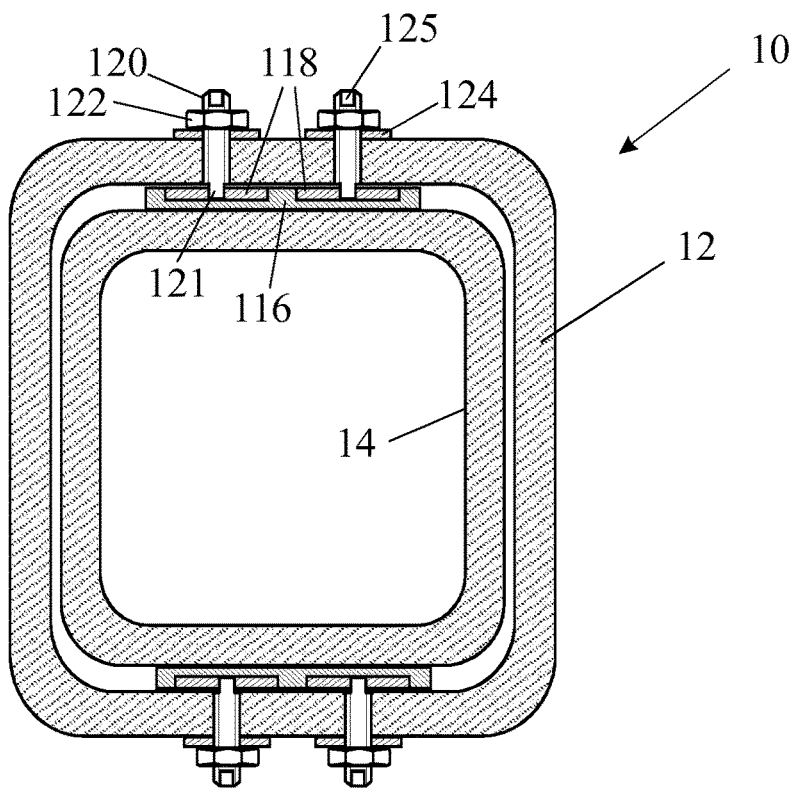
FIG. 5 is a view similar to that of FIG. 1 showing an embodiment of the invention.

In FIG. 5, the inner section 14 is supported within the outer section 12 of the boom 10 by means of two wear pad assemblies arranged one beneath and one above the inner section 12. Each wear pad assembly comprises a wear pad 116 as shown in exploded view in FIG. 6. Each wear pad 116 comprises a body 116a made of a suitable material, such as nylon, having a hardness lower than that of the inner section 14 of the boom 10. The body 116a has a first surface 116b facing the inner section 14 and a second surface 116c facing the outer section 12. The first surface 116b is a flat continuous surface while the second surface 116c is formed with two circular recesses 116d each of which received a respective rigid plate 118 having central cylindrical hole 119. The rigid plates 118 are secured to the body 116 by virtue of being an interference fit in the recesses 116d.

Two studs 120 are screw threaded into the outer section 12 of the boom in alignment with the holes 119 in the rigid plates 118. As an alternative, the studs 120 may be screwed into a mounting plate, similar to the previously described mounting plate 18 that is itself secured to the outer section 12 of the boom 10. The ends of the studs 120 are formed with a cylindrical spigot 121, or dog, that fits within, and is free to rotate relative to, the hole 119 in the rigid plate 118. Each stud 120 is formed with a non-circular recess 125, to receive a drive implement, such as an Allen key, to apply torque to the stud. In this way, the stud can be turned to urge the wear pad 116 against the outer surface of the inner section 14 of the boom 10. Once the position of the wear pad 116 has been set, the stud is prevented from rotating by tightening a lock nut 122 against the outer surface of the outer section 12 of the boom 10. A washer 124 is inserted between the lock nut 122 and the outer section 12 of the boom.

Figure 6:
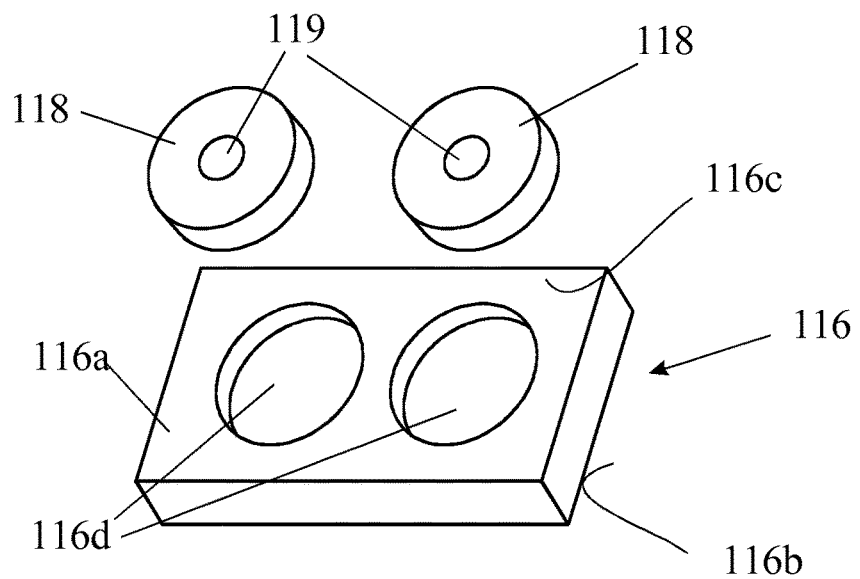
FIG. 6 is an exploded view of the wear pad employed in the embodiment of FIG. 6.

The assemblies described by reference to FIGS. 5 and 6 are adjustable without the need for them to be dismantled, without the need to stock shims of different of sizes and without the need for special equipment to take up the weight of the inner section as shims are being added or replaced. This makes for easier installation and maintenance thereby also reducing cost. A further advantage is that a larger area of the wear pad is in contact with outer surface of the inner section of the boom providing better support and longer lasting wear pads.

The invention claimed is:

1. A wear pad assembly for mounting between an inner and an outer section of a telescopic boom, comprising:
    a wear pad having a continuous first side having an area substantially equal to an area bounded by lateral edges of the wear pad, the first side configured for contacting an outer wall of an inner section of the boom, and a second side facing an inner wall of an outer section of the boom,
    at least one plate is secured to the second side of the wear pad so as not to be movable relative to the wear pad, wherein the at least one plate is secured by an interference fit in a recess formed in the second side of the wear pad; and
    a stud in screw-threaded engagement with the outer section of the boom or a member secured to the outer section of the boom is associated with said at least one plate, an end of stud and the associated said at least one plate having mating formations to enable the stud to urge the first surface of the wear pad against the outer wall of the inner section of the boom while preventing the wear pad from being displaced in a plane normal to the axis of rotation of the stud.

2. A wear pad assembly as claimed in claim 1, wherein the mating formations comprising a circular hole in said at least one plate and a cylindrical spigot on the end of the stud.

3. A wear pad assembly as claimed in claim 1, wherein a lock nut is provided for preventing rotation of each stud relative to the outer section of the boom.

4. A wear pad assembly as claimed in claim 3, wherein a washer is provided between the lock nut and the outer section of the boom or the member secured to the outer section of the boom.

5. A wear pad assembly as claimed in claim 1, wherein the end of each stud remote from the associated wear pad is formed with a non-circular recess for receiving a drive key.

6. A wear pad for mounting between an inner and an outer section of a telescopic boom, comprising:
    a body of plastic material having a first side and a second side facing opposite the first side, wherein one of the first and second sides is continuous and at least one plate is secured to the other of the first and second sides of the body, the at least one plate being formed with a formation capable of interacting with a screw threaded stud to prevent the wear pad from moving in a plane normal to the axis of the stud
    wherein the said at least one plate is two plates secured to the other of the first and second sides of the body.

7. A wear pad as claimed in claim 6 wherein the plates are each secured to the body by being an interference fit in a respective recess formed in the other of the first and second sides of the body.

8. A wear pad as claimed in claim 6, wherein the formation in each plate comprises a cylindrical bole for receiving a cylindrical spigot formed on the end of an associated stud.

9. A wear pad assembly for mounting between an inner and an outer section of a telescopic boom, comprising:
    a wear pad having a continuous first side for contacting an outer wall of an inner section of the boom, and a second side facing an inner wall of an outer section of the boom,
    at least one plate is secured to the second side of the wear pad so as not to be movable relative to the wear pad, wherein the at least one plate is secured by an interference fit in a recess formed in the second side of the wear pad; and
    a stud in screw-threaded engagement with the outer section of the boom or a member secured to the outer section of the boom is associated with said at least one plate, an end of stud and the associated said at least one plate having mating formations to enable the stud to urge the first surface of the wear pad against the outer wall of the inner section of the boom while preventing the wear pad from being displaced in a plane normal to the axis of rotation of the stud,
    wherein said at least one plate comprises two plates that are secured to the second side of the wear pad.

* * * * *